US012658498B2

(12) United States Patent
Ke et al.

(10) Patent No.: US 12,658,498 B2
(45) Date of Patent: Jun. 16, 2026

(54) CELL LEAD-OUT PIECE, BATTERY, AND ELECTRIC VEHICLE

(71) Applicant: BYD COMPANY LIMITED, Shenzhen (CN)

(72) Inventors: Wenyu Ke, Shenzhen (CN); Huan Zhang, Shenzhen (CN); Shian Xu, Shenzhen (CN); Guishu Zhou, Shenzhen (CN); Jichao Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 756 days.

(21) Appl. No.: 18/083,931

(22) Filed: Dec. 19, 2022

(65) Prior Publication Data

US 2023/0119288 A1 Apr. 20, 2023

Related U.S. Application Data

(63) Continuation of application No. PCT/CN2021/100333, filed on Jun. 16, 2021.

(30) Foreign Application Priority Data

Jun. 28, 2020 (CN) .......................... 202021216701.6

(51) Int. Cl.
*H01M 10/654* (2014.01)
*B60L 50/64* (2019.01)
(Continued)

(52) U.S. Cl.
CPC ........... *H01M 10/654* (2015.04); *B60L 50/64* (2019.02); *H01M 50/533* (2021.01); *H01M 50/534* (2021.01); *H01M 50/536* (2021.01)

(58) Field of Classification Search
CPC ............. H01M 10/654; H01M 50/533; H01M 50/534; H01M 50/536; H01M 2220/20;
(Continued)

(56) References Cited

U.S. PATENT DOCUMENTS

2013/0136977 A1* 5/2013 Masuda .............. H01M 50/567
429/178

FOREIGN PATENT DOCUMENTS

CN 201663187 U 12/2010
CN 202549971 U 11/2012
(Continued)

OTHER PUBLICATIONS

The World Intellectual Property Organization (WIPO) International Search Report for PCT/CN2021/100333 Sep. 15, 2021 5 pages (with translation).

*Primary Examiner* — Lisa S Park
(74) *Attorney, Agent, or Firm* — Wenye Tan

(57) ABSTRACT

A cell lead-out sheet, a battery and an electric vehicle are provided. The cell lead-out sheet includes a heat-conducting member, a main body, and two extending branches bent and extending from one end of the main body. The main body is configured to electrically connect a positive/negative terminal of a battery. The two extending branches are respectively configured to electrically connect to tabs of an electrode core in the battery. The two extending branches are spaced apart from each other to form an installation gap. The heat-conducting member is arranged on a side of the two extending branches facing away from the electrode core. The heat-conducting member at least partially covers the installation gap.

18 Claims, 3 Drawing Sheets

(51) Int. Cl.
    *H01M 50/533*     (2021.01)
    *H01M 50/534*     (2021.01)
    *H01M 50/536*     (2021.01)

(58) Field of Classification Search
    CPC ........... H01M 10/653; H01M 10/6554; H01M
             10/6556; H01M 10/613; H01M 10/625;
             H01M 10/647; H01M 10/6551; H01M
             10/6553; H01M 50/50; H01M 50/531;
             H01M 50/543; H01M 50/548; H01M
             50/55; H01M 50/553; H01M 50/593;
             B60L 50/64; B60L 2240/545; B60L
             50/60; B60L 58/26; B23K 2101/36;
             B23K 26/21; B23K 20/10; Y02E 60/10;
                        Y02T 10/70
    See application file for complete search history.

(56)                 References Cited

FOREIGN PATENT DOCUMENTS

| CN | 106972119 | A | 7/2017 |
|----|-----------|---|--------|
| CN | 206650127 | U | 11/2017 |
| CN | 207183463 | U | 4/2018 |
| CN | 108807827 | A | 11/2018 |
| CN | 209675429 | U | 11/2019 |
| CN | 212277344 | U | 1/2021 |
| EP | 2445034 | A1 | 4/2012 |
| JP | 2013137990 | A | 7/2013 |
| JP | 2016225117 | A | 12/2016 |
| WO | 2019082752 | A1 | 5/2019 |

* cited by examiner

CELL LEAD-OUT PIECE, BATTERY, AND ELECTRIC VEHICLE

CROSS-REFERENCE TO RELATED APPLICATIONS

This application is a continuation application of PCT application No. PCT/CN2021/100333 filed on Jun. 16, 2021, which claims priority to Chinese Patent Application No. 202021216701.6, filed on Jun. 28, 2020, and entitled "CELL LEAD-OUT SHEET, BATTERY AND ELECTRIC VEHICLE", the content of all of which is incorporated herein by reference in its entirety.

FIELD

The present disclosure relates to the field of electric vehicles, and specifically to a cell lead-out sheet, a battery and an electric vehicle.

BACKGROUND

At present, high-power batteries, such as those used in hybrid electric vehicles (HEVs) or mild hybrid electric vehicles (mHEVs), mostly adopt an all-tab design. HEV/mHEV batteries have high requirements for power performance, and inevitably need to be frequently charged and discharged at high rates, which leads to the generation of a large amount of heat by the battery.

SUMMARY

The present disclosure provides a cell lead-out sheet with good heat dissipation performance. The heat dissipation performance of the cell lead-out sheet is improved by arranging a heat-conducting member at an installation gap between two extending branches of the cell lead-out sheet.

According to one aspect, the present disclosure provides a cell lead-out sheet, including a heat-conducting member, a main body, and two extending branches bent and extending from one end of the main body, where the main body is configured to electrically connect a positive terminal and/or a negative terminal of a battery, the two extending branches are respectively configured to electrically connect to tabs of an electrode core in the battery, the two extending branches are spaced apart from each other to form an installation gap, the heat-conducting member is arranged on a side of the two extending branches facing away from the electrode core, and the heat-conducting member at least partially covers the installation gap. The electrode core is formed by winding a positive electrode plate, a separator and a negative electrode plate. Tabs respectively extending from the positive and negative electrode plates for conducting current are arranged on two sides of the wound electrode core. To increase output power of the electrode core to reduce the internal resistance, generally a plurality of tabs are press-fit to form an all-tab design, and the press-fit tabs are electrically connected to the positive terminal and/or the negative terminal outside the housing through the cell lead-out sheets. The electrical connection between the cell lead-out sheet and the tab is achieved by welding the two extending branches to two sides of the tab. To meet the requirements of battery assembly, the two extending branches need to be spaced apart, so as to form the installation gap. The installation gap is used for battery assembly. In the present disclosure, the heat-conducting element is arranged on the side of the installation gap facing away from the electrode core. Therefore, the heat dissipation area of the cell lead-out sheet is increased through the heat-conducting member, thereby improving the heat dissipation effect of the cell lead-out sheet. Specifically, the heat-conducting member may be a heat dissipation sheet, a heat dissipation net, or other structures capable of dissipating heat, which is not particularly limited herein. The arrangement of the heat dissipation sheet in the installation gap is a reasonable utilization of the structure of the space, and increases the heat dissipation area of the cell lead-out sheet and improves the heat dissipation effect without affecting the operation of the electrode core.

According to another aspect, the present disclosure provides a battery, including a housing, an electrode core, and the cell lead-out sheets described above. The cell lead-out sheet and the electrode core are electrically connected to form an electrode core assembly. The electrode core assembly is received in the housing. In an embodiment, the cell lead-out sheet is electrically connected to a tab of the electrode core, and the cell lead-out sheet and the electrode core are both received in the housing. Specifically, the housing includes a lower housing and a cover plate. The lower housing includes a receiving space. The cell lead-out sheet is arranged in the receiving space. A positive terminal and/or a negative terminal are arranged on the cover plate. The tabs are connected to the positive terminal and/or the negative terminal through the cell lead-out sheets.

According to a third aspect, the present disclosure provides an electric vehicle, including the battery described above. In the foregoing embodiments, the cell lead-out sheet of the battery has a good heat dissipation effect, which can effectively solve the heat dissipation problem during the operation of the electrode core, and prevent the electric vehicle from abnormal operation in use due to an excessively high temperature of the electrode core.

DETAILED DESCRIPTION

The following describes certain specific implementations of the present disclosure with reference to the accompanying drawings.

A high-power battery often generates a large amount of heat, which can cause several problems. (1) The generation of a large amount of heat leads to accelerated battery deterioration and reduced cycle/storage life. (2) The accumulation of heat makes it difficult to dissipate the heat, which may result in safety risks. (3) The poor thermal conductivity of the battery requires external liquid cooling, which brings about the problems of high energy consumption and high carbon emissions. How to improve the heat dissipation performance of the battery has now become the main problem to be solved in terms of battery design.

The present disclosure provides a cell lead-out sheet 10. The cell lead-out sheet 10 may be widely used in battery assembly. For a more detailed description of the features of the cell lead-out sheet 10 in the solution, refer to FIG. 1 to FIG. 5.

Figure 1:
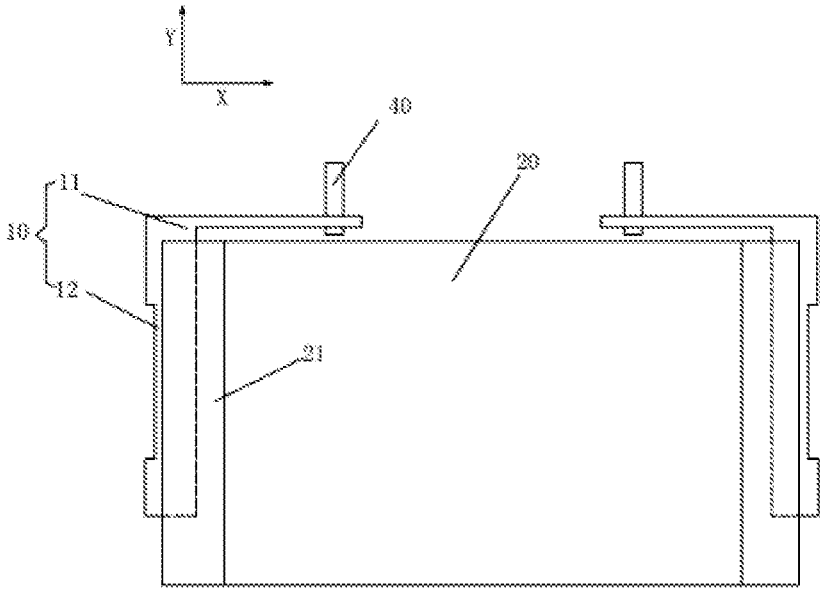
FIG. 1 is a schematic structural diagram showing installation of a cell lead-out sheet and an electrode core with a heat-conducting member being hidden according to an embodiment of the present disclosure.
Figure 2:
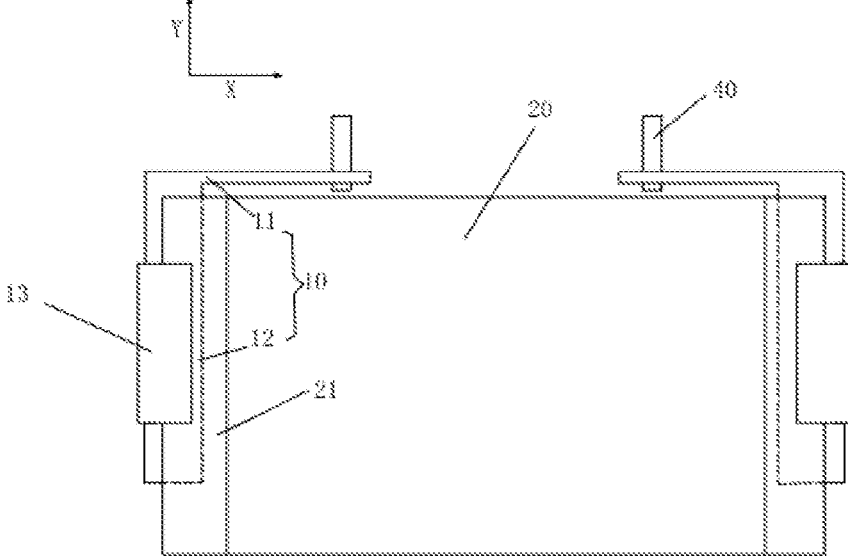
FIG. 2 is a schematic structural diagram showing installation of a cell lead-out sheet and an electrode core according to an embodiment of the present disclosure.

FIG. 1 and FIG. 2 are schematic structural diagrams showing installation of a cell lead-out sheet 10 and an electrode core 20. FIG. 1 is a schematic structural diagram of the cell lead-out sheet 10 with a heat-conducting member 13 being hidden. The cell lead-out sheet 10 includes a main body 11 and two extending branches 12 extending from the main body 11. The main body 11 is externally connected to a positive/negative terminal 40. The two extending branches 12 are respectively electrically connected to the electrode core 20.

Figure 3:
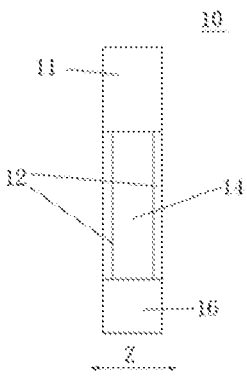
FIG. 3 is a schematic structural diagram of a cell lead-out sheet with a heat-conducting member being hidden according to an embodiment of the present disclosure.

As shown in FIG. 3, the two extending branches 12 are spaced apart to form an installation gap 14. The installation gap 14 is a space prefabricated for the subsequent welding of the cell lead-out sheet 10 and tabs 21 to facilitate placement of welding equipment. The heat-conducting element 13 is arranged on a side of the installation gap 14 facing away from the electrode core 20. The electrode core 20 in the embodiments is generally formed by winding a positive electrode plate, a separator and a negative electrode plate. Tabs 21 respectively extending from the positive and negative electrode plates for conducting current are arranged on two sides of the wound electrode core 20. To increase output power of the electrode core 20 to reduce the internal resistance, generally a plurality of tabs 21 are press-fit to form an all-tab design, and the press-fit tabs 21 are electrically connected to the positive/negative terminal 40 outside through the cell lead-out sheets 10. The electrical connection between the cell lead-out sheet 10 and the tab 21 is achieved by welding the two extending branches 12 to two sides of the tab 21. As shown in FIG. 3, to meet the requirements of battery arrangement, the two extending branches 12 need to be spaced apart, so as to form the installation gap 14.

As shown in FIG. 2, for the design of this embodiment, the heat-conducting element 13 is arranged on the side of the installation gap 14 facing away from the electrode core 20, and the heat-conducting member 13 at least partially covers the installation gap 14. Therefore, the heat dissipation area of the cell lead-out sheet 10 is increased through the heat-conducting member 13, thereby improving the heat dissipation effect of the cell lead-out sheet 10. It should be noted that the heat-conducting member 13 may be a heat dissipation sheet, a heat dissipation net, or other structures capable of dissipating heat, which is not particularly limited herein. The arrangement of the heat dissipation sheet 13 in the installation gap is a reasonable utilization of the structure of the space, and increases the heat dissipation area of the cell lead-out sheet 10 and improves the heat dissipation effect without affecting the operation of the electrode core 20.

Specifically, as shown in FIG. 1 and FIG. 3, an extending direction of the main body 11 is defined as a first direction X, an extending direction of the two extending branches 12 is defined as a second direction Y, and the two extending branches 12 are spaced apart from each other in a third direction Z. The first direction X, the second direction Y and the third direction Z are perpendicular to each other.

Figure 4:
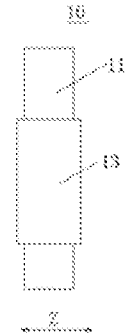
FIG. 4 is a schematic structural diagram of a cell lead-out sheet according to an embodiment of the present disclosure.

In an embodiment, as shown in FIG. 2, FIG. 3, and FIG. 4, the heat-conducting member 13 completely covers the installation gap 14. In one embodiment, because the heat-conducting member 13 completely covers the installation gap 14 between the extending branches 12, the heat dissipation area of the entire cell lead-out sheet 10 is increased, thereby maximizing the heat dissipation effect. The technical solution of the present disclosure can properly utilize the installation gap 14 between the two extending branches 12 to increase the heat dissipation area of the cell lead-out sheet 10. Therefore, in one embodiment, the heat-conducting member 13 completely covers the installation gap 14, so as to improve the heat dissipation effect as much as possible.

In an embodiment, as shown in FIG. 2, FIG. 3, and FIG. 4, a direction along which the two extending branches 12 are opposite to each other is defined as the third direction Z, and two ends of the heat-conducting member 13 in the third direction Z are respectively connected to the two extending branches 12. Specifically, the two ends of the heat-conducting member 13 in the third direction Z are respectively adhered to the two extending branches 12. Various adhesion methods may be used. For example, an adhesive is applied on the two ends of the heat-conducting member 13, and then the two ends are adhered to the two extending branches 12 to completely cover the installation gap 14. Alternatively, the two ends of the heat-conducting member 13 are placed on the extending branch 12 respectively, and then the heat-conducting member 13 is fixed to the extending branch 12 with an adhesive tape to completely cover the installation gap 14.

Figure 5:
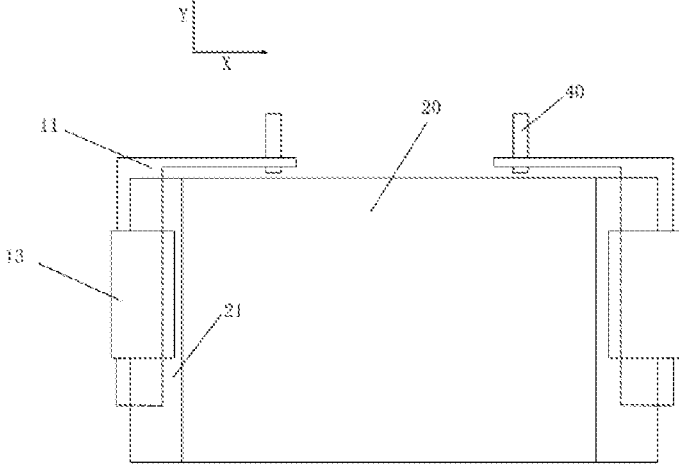
FIG. 5 is a schematic structural diagram showing installation of a cell lead-out sheet and an electrode core according to another embodiment of the present disclosure.

In an embodiment, as shown in FIG. 3, FIG. 4, and FIG. 5, the direction along which the two extending branches 12 are opposite to each other is defined as the third direction Z, and one end of the heat-conducting member 13 in the third direction Z is connected to one side of the tab 21. Specifically, to make the heat-conducting member 13 more firmly installed, in one embodiment, one end of the heat-conducting member 13 is connected to one side of the tab 21 by welding, and the other end of the heat-conducting member 13 only needs to be bent to cover the installation gap 14. In another embodiment, the two ends of the heat-conducting member 13 may be fixedly connected to the two sides of the tab 21 by an adhesive tape. It should be noted that the heat-conducting member 13 may be connected to the tab 21 by any method as long as the heat-conducting member 13 completely covers the installation gap 14.

Figure 6:
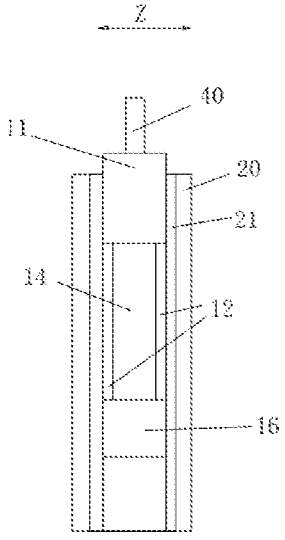
FIG. 6 is a left view showing installation of a cell lead-out sheet according to an embodiment of the present disclosure.

In an embodiment, as shown in FIG. 6, a surface of one of the extending branches 12 fits to one side of the tab 21, and a surface of the other extending branch 12 fits to another side of the tab 21. Such a fitting design increases the power of current transmission on the one hand, and also increases the heat dissipation capability of the extending branches 12 on the other hand.

In an embodiment, as shown in FIG. 3 and FIG. 6, a connection portion 16 is arranged on one end of the extending branches 12 away from the main body 11, and the connection portions 16 are configured to connect the two extending branches 12. The design of the connection portions 16 is to connect the two extending branches 12 to ensure the stability of the structure.

In an embodiment, as shown in FIG. 6, a surface of the extending branches 12 is connected to the tab 21 by welding. The welding method used herein may be ultrasonic welding or laser welding to ensure the flatness and stability of the structure.

It should be noted that the heat-conducting member in the present disclosure is a material with good thermal conductivity.

Specifically, the heat-conducting member is made of a metal material. The metal material may be one or more selected from aluminum, brass, copper, steel, or iron. It should be noted that after the heat-conducting member made of the metal material is selected, a side spacer may be added to the tab. Generally, the side spacer is sleeved on the side tab end. The side spacer is an insulating material, for example, plastic such as PP or PE, to prevent the heat-conducting member made of the metal material from contacting the housing of the battery, thereby avoiding problems such as current leakage and short circuit.

Specifically, the heat-conducting member is made of thermally conductive silicone. The heat-conducting silicone material is an insulating thermally conductive material, such as one or more of aluminum oxide, silicon oxide, magnesium oxide, zinc oxide, aluminum nitride, boron nitride, magnesium oxide, silicon carbide, etc. The heat-conducting member made of the thermally conductive silicone have good insulation properties to avoid accidents such as short circuit or current leakage due to the arrangement of the heat-conducting member.

Specifically, the heat-conducting member is made of composite ceramic. The composite ceramic herein is mainly a mixture of plastic and a highly thermally conductive material. The plastic may be one or more of polypropylene (PP) or polyethylene (PE). The highly thermally conductive material may be one or more of aluminum oxide, silicon oxide, magnesium oxide, zinc oxide, aluminum nitride, boron nitride, magnesium oxide, silicon carbide, etc. The heat-conducting member made of the composite ceramic not only meets the heat dissipation requirements, but also avoids the risk of short circuit or current leakage.

In an embodiment, the heat-conducting member is a carbon-based material. The carbon-based material herein includes a heat dissipation layer and a thermally conductive insulation layer. The heat dissipation layer may be one or more of graphene, carbon black, carbon tubes, graphite, or other carbon-based materials. The thermally conductive insulation layer may be one or more of thermally conductive silica gel or composite ceramic.

Figure 7:
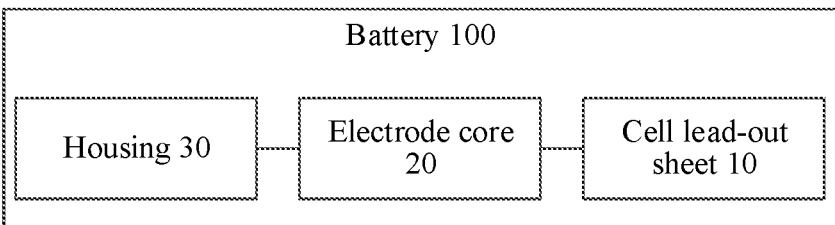
FIG. 7 is a block diagram of a battery according to an embodiment of the present disclosure.

According to another aspect, referring to FIG. 7, the present disclosure provides a battery 100, which includes a housing 30, an electrode core 20 and a cell lead-out sheet 10. The cell lead-out sheet 10 and the electrode core 20 are electrically connected to each other and are received in the housing 30. In an embodiment, the cell lead-out sheet is electrically connected to a tab of the electrode core, and the cell lead-out sheet and the electrode core are both received in the housing. Specifically, the housing includes a lower housing and a cover plate. The lower housing includes a receiving space. The cell lead-out sheet is arranged in the receiving space. A positive terminal and/or a negative terminal are arranged on the cover plate. The tab is connected to the positive terminal and/or the negative terminal through the cell lead-out sheet. In one embodiment, the battery has a good heat dissipation effect due to the design of the heat-conducting member on the cell lead-out chip, thereby avoiding the danger caused by an excessively high temperature of the electrode core during operation.

The battery provided in one embodiment can greatly reduce the contact thermal resistance on the side of the electrode core after using the cell lead-out sheet including the heat-conducting member. A set of actual measurement data is used for comparison and description.

Experimental steps are as follows. (1) The cell lead-out sheet including the heat-conducting member was used to assemble a battery. (2) At least three thermocouples were arranged on each outer surface of the housing to ensure the accuracy of temperature sampling. Test conditions were: 25° C., 50% SOC battery, continuous charging and discharging at 6 C/10 S. When the temperature of each thermocouple reached equilibrium (equilibrium condition: temperature change is no more than 0.5° C./10 min), experimental data was obtained under the above conditions. (3) An initial cell was taken, from which the heat-conducting member was removed. Then, the cell was tested according to the above method, and experimental data was obtained again. (4) The contact thermal resistance in each directions of the cell was calculated through simulation according to the actually measured data.

Data in Table 1 below was obtained:

TABLE 1

| Unit ($K * m^2/W$) | Not including the heat-conducting member | Including the heat-conducting member |
|---|---|---|
| Side | 0.002915 | 0.0015 |
| Large surface | 0.00245 | 0.00245 |
| Top surface | 0.04 | 0.04 |
| Bottom surface | 0.02 | 0.02 |

It can be seen from Table 1 that the contact thermal resistance data of the side of the electrode core decreased from 0.002915 $K*m^2/W$ to 0.0015 $K*m^2/W$ after the heat-conducting member was added, indicating that the cell lead-out sheet including the heat-conducting member in the present disclosure had a good effect on the heat dissipation of the electrode core.

Figure 8:
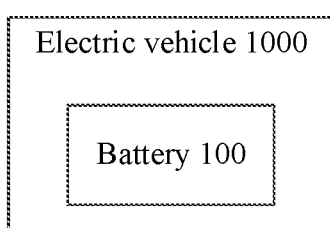
FIG. 8 is a block diagram of an electric vehicle according to an embodiment of the present disclosure.

According to a third aspect, referring to FIG. 8, the present disclosure provides an electric vehicle 1000, including the above-mentioned battery 100. In the foregoing embodiments, the cell lead-out sheet of the battery has a good heat dissipation effect, which improves the heat dissipation performance of the electrode core and avoids the safety risks caused by an excessively high temperature of the electrode core. In addition, if the heat dissipation performance of the electrode core itself is poor, external equipment is required for liquid cooling, which increases the energy consumption of the electric vehicle and brings about the problem of high carbon emissions. Therefore, the present disclosure can also reduce the thermal resistance of the entire battery pack and reduce the energy consumption of the entire vehicle.

Further, according to certain embodiments of the present disclosure, by arranging the heat-conducting member at the installation gap between the two extending branches, the heat-dissipating area of the cell lead-out sheet is increased without affecting the operation of the cell lead-out sheet, thereby improving the heat dissipation effect.

The foregoing contents are merely certain implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A cell lead-out sheet, comprising:
a heat-conducting member,
a main body, and
two extending branches bent and extending from one end of the main body, wherein:
the main body is configured to electrically connect a positive terminal or a negative terminal of a battery,
the two extending branches are respectively configured to electrically connect to a tab of an electrode core in the battery,
the two extending branches are spaced apart from each other to form an installation gap,
the heat-conducting member is arranged on a side of the two extending branches facing away from the electrode core, and
the heat-conducting member at least partially covers the installation gap,
wherein the heat-conducting member is made of composite ceramic.

2. The cell lead-out sheet according to claim 1, wherein the heat-conducting member completely covers the installation gap.

3. The cell lead-out sheet according to claim 2, wherein two ends of the heat-conducting member are respectively connected to the two extending branches.

4. The cell lead-out sheet according to claim 2, wherein one end of the heat-conducting member is configured to connect to one side of the tab, and another end of the heat-conducting member is configured to bend to cover the installation gap.

5. The cell lead-out sheet according to claim 3, wherein:
an extending direction of the main body is defined as a first direction,
an extending direction of the two extending branches is defined as a second direction,
the two extending branches are spaced apart from each other in a third direction, and
the first direction, the second direction, and the third direction are perpendicular to each other.

6. The cell lead-out sheet according to claim 5, wherein a surface of one of the extending branches fits to one side of the tab, and a surface of the other extending branch fits to another side of the tab.

7. The cell lead-out sheet according to claim 6, further comprising:
a connection portion located on one end of the extending branches away from the main body, wherein the connection portions are configured to connect the two extending branches.

8. The cell lead-out sheet according to claim 6, wherein the extending branches are connected to the tab by welding.

9. The cell lead-out sheet according to claim 8, wherein the extending branches are connected to the tab by ultrasonic welding or laser welding.

10. The cell lead-out sheet according to claim 1, wherein the heat-conducting member is made of a metal material.

11. The cell lead-out sheet according to claim 10, wherein a side spacer made of an insulating material is arranged on the tab to space the heat-conducting member apart from a housing of the battery.

12. The cell lead-out sheet according to claim 1, wherein the composite ceramic comprises a mixture of plastic and a highly thermally conductive material.

13. A cell lead-out sheet, comprising:
a heat-conducting member,
a main body, and
two extending branches bent and extending from one end of the main body, wherein:
the main body is configured to electrically connect a positive terminal or a negative terminal of a battery,
the two extending branches are respectively configured to electrically connect to a tab of an electrode core in the battery,
the two extending branches are spaced apart from each other to form an installation gap,
the heat-conducting member is arranged on a side of the two extending branches facing away from the electrode core, and
the heat-conducting member at least partially covers the installation gap,
wherein the heat-conducting member is a carbon-based material.

14. The cell lead-out sheet according to claim 13, wherein the carbon-based material comprises a heat dissipation layer and a thermally conductive insulation layer.

15. A battery, comprising a housing, an electrode core, and the cell lead-out sheet according to claim 1, wherein the electrode core and the cell lead-out sheet are received in the housing.

16. The battery according to claim 15, wherein the housing comprises a lower housing and a cover plate, the lower housing comprises a receiving space, and the cell lead-out sheet is arranged in the receiving space.

17. The battery according to claim 16, wherein a positive terminal or a negative terminal is arranged on the cover plate, and the tab is connected to the positive terminal or the negative terminal through the cell lead-out sheet.

18. An electric vehicle, comprising:
an electrode core;
a cell lead-out sheet; and
a housing for receiving the electrode core and the cell lead-out sheet,
wherein the cell lead-out sheet comprises:
a heat-conducting member,
a main body, and
two extending branches bent and extending from one end of the main body, wherein:
the main body is configured to electrically connect a positive terminal or a negative terminal of a battery,
the two extending branches are respectively configured to electrically connect to a tab of an electrode core in the battery,
the two extending branches are spaced apart from each other to form an installation gap,
the heat-conducting member is arranged on a side of the two extending branches facing away from the electrode core, and
the heat-conducting member at least partially covers the installation gap,
wherein the heat-conducting member is made of thermally conductive silicone.

* * * * *